Figure 1:
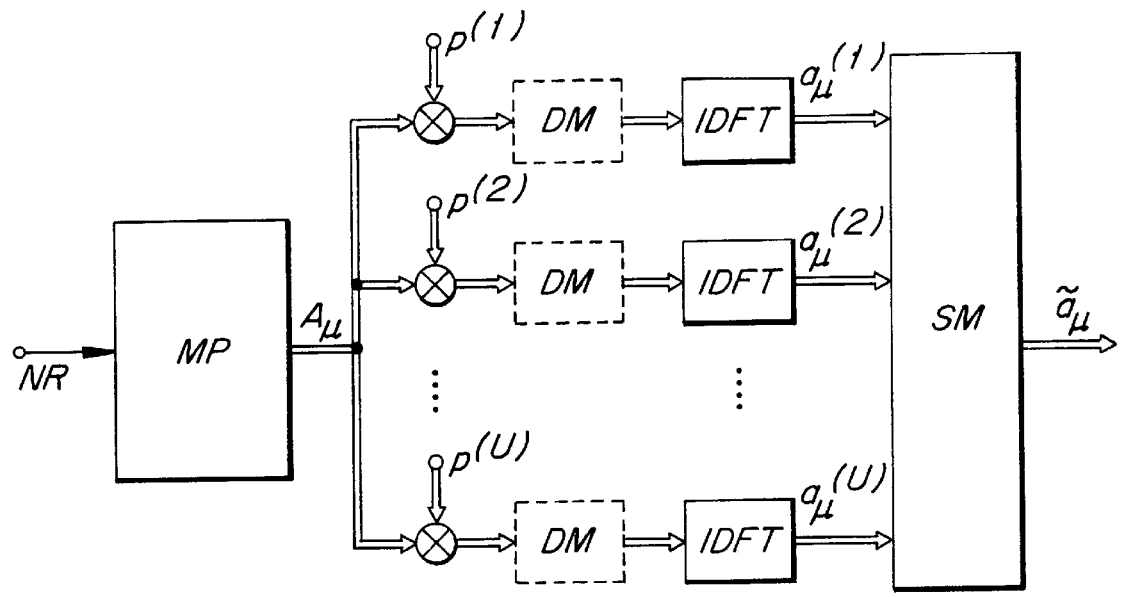

United States Patent
Bäuml et al.

[11] Patent Number: 6,125,103
[45] Date of Patent: Sep. 26, 2000

[54] METHOD AND DEVICE FOR REDUCING THE CREST FACTOR IN DIGITAL TRANSMISSION PROCEDURES

[75] Inventors: Robert Bäuml, Nürnberg; Robert Fischer, Erlangen; Johannes Huber, Langensendelbach; Stefan Müller, Erlangen, all of Germany

[73] Assignee: Telefonaktiebolaget LM Ericsson, Stockholm, Sweden

[21] Appl. No.: 08/922,394

[22] Filed: Sep. 3, 1997

[30] Foreign Application Priority Data

Sep. 4, 1996 [DE] Germany ................. 196 35 813

[51] Int. Cl.[7] .................. H04J 1/00; H04L 23/02
[52] U.S. Cl. .................. 370/203; 370/480; 375/222; 375/261
[58] Field of Search ................. 370/203, 206, 370/207, 208, 210, 480; 375/254, 260, 261, 222; 330/126

[56] References Cited

U.S. PATENT DOCUMENTS

| | | | |
|---|---|---|---|
| 5,128,964 | 7/1992 | Mallory | 375/261 |
| 5,214,672 | 5/1993 | Eyuboglu et al. | 375/254 |
| 5,302,914 | 4/1994 | Arntz et al. | 330/129 |
| 5,636,247 | 6/1997 | Kamerman et al. | 375/260 |
| 5,790,550 | 8/1998 | Peeters et al. | 370/480 |
| 5,835,536 | 11/1998 | May et al. | 375/260 |

FOREIGN PATENT DOCUMENTS

0 702 466   3/1996   European Pat. Off. .......... H04L 5/06

OTHER PUBLICATIONS

Pauli, M. et al., "Reduction of out-of-band radiation caused by non-linearities in multicarrier methods", ITG Technical Report 135, pp. 467–474.

Jones, A.E., et al., "Block coding scheme for reduction of peak to mean envelope power ratio of multicarrier transmission schemes", Electronics Letters, vol. 30, No. 25, Dec. 8, 1994, pp. 2098–2099.

Friese, M., "Multicarrier modulation with low peak-to-average power ratio", Electronics Letters, vol. 32, No. 8, Apr. 11, 1996, pp. 713–714.

Wulich, D., "Reduction of peak to mean ratio of multicarrier modulation using cyclic coding", Electronics Letters, vol. 32, No. 5, Feb. 29, 1996, pp. 432–433.

*Primary Examiner*—Hassan Kizou
*Assistant Examiner*—John Pezzlo
*Attorney, Agent, or Firm*—Burns, Doane, Swecker & Mathis, L.L.P.

[57] ABSTRACT

The major problem in multicarrier transmission procedures consists in the very high crest factor of the transmit signal. This means, that very high signal peak values occur even with a moderate transmission power. It is the object of the invention to provide a method and device, whereby a definite reduction of signal peaks is achieved with moderate expenditure. This is obtained by generating, in addition to the information to be transmitted, several alternative, information-equivalent information sequences by means of determined reversible unambiguous representations. From these alternatives a sequence being favorable in view of the peak value of the pertinent transmit signal is selected and transmitted. The receiver is in a position to regenerate the original information from said receiving signal through the inversion of the performed representation.

17 Claims, 2 Drawing Sheets

METHOD AND DEVICE FOR REDUCING THE CREST FACTOR IN DIGITAL TRANSMISSION PROCEDURES

The invention relates to a method and a device for reducing the signal peak-to-average power ratio of the transmit signal in digital transmission procedures.

A system for multicarrier transmission is known from the prior art according to EP 702 466 A2, whereby the data stream to be transmitted is partitioned into several parallel sub-channels, which are transmitted into frequency multiplexing. The crest factor, which is defined as the ratio of the peak voltage to the average voltage, is thereby reduced by using a first set of four symmetrically arranged sub-channel pairs for encoding the information bits, wherein the resulting phase vector for each pair of sub-channel pairs contained in the second set is vertical to the resulting phase vector of one of the pairs in the first set of sub-channels. However, the reduction of the peak value is here too ineffective and too low.

Moreover, systems are known in the field of digital telecommunication transmission enabling a high-rated data transmission. One technique becoming increasingly important in this respect is the multicarrier transmission, which is known by the name Orthogonal Frequency Division Multiplexing (OFDM), Discrete Multi Tone (DMT) and Multi Carrier Modulation (MCM). In multicarrier transmission the data stream to be transmitted is partitioned into many parallel sub-channels, which are preferably transmitted in frequency multiplexing. Besides, however, other multiplexing techniques can also be applied. It is characteristic in each case, that the available transmission medium is decomposed into many parallel sub-channels, also called carriers, which can be used independent of each other. Preferably, Phase Shift Keying (PSK) or Quadrature Amplitude Modulation (QAM) modulation methods are applied in the individual sub-channels. A realization of this principle being favorable in terms of expenditure consists in the application of the fast fourier transform (FFT). By introducing a so-called guard interval, whereby a block of transmit symbols is expanded by partial cyclic repetition, linear distortions of the transmission medium, or multipath transmission respectively, merely result in independent weighting according to rate and phase of each sub-channel. If a differential modulation is used, i.e. if the information is denoted on the difference of two consecutive symbols, no equalization in the receiver is required, since not the absolute signal but only the relative change bears the information.

A substantial disadvantage in multicarrier transmission methods is that very high power peaks can occur even in case of moderate average transmission performances. This is due to the independence of the sub-channels resulting in a possible constructive overlapping of the sub-signals. A factor for the power peaks is the so-called crest factor $\zeta$ $$\zeta = \sqrt{\frac{\text{crest factor performance}}{\text{average performance}}}$$

which in information technology plays a decisive role in dimensioning the transmitter amplifier used. For high peak values a great maximum performance, the so-called back-off, is thereby required, resulting in the amplifiers operating with a very poor efficiency. On the other hand, the amplifiers must not be operated too close to the saturation, for the amplifying characteristic clearly deviates from the ideal linear course. If, moreover, the transmission phase is overloaded, saturation effects of the amplifier cause an out-of-band radiation, i.e. the transmit power is spread out of the frequency band available for the transmission and disturbs possibly present transmission systems.

By a reduction of the crest value of multicarrier transmit signal on the transmit side, smaller and thus substantially inexpensive power amplifiers could be applied if the effective power to be radiated is predetermined. Multicarrier transmission methods would thereby become even more attractive.

The prior art, moreover, discloses further attempts to reduce the crest factor of multicarrier transmit signals.

The essay "Reduzierung der duch Nichtlinearitäten hervorgerufenen Außerbandstrahlung bei einem Mehrträgerverfahren" [Reduction of out-of-band radiation caused by non-linearities in multicarrier methods" by M. Pauli and H. -P. Kuchenbecker, ITG Technical Report 136 "Mobile Communication", a method is introduced, whereby the peak amplitudes are increased by subsequently processing the transmit signal. For this purpose, said peak amplitudes are searched for in a first step, and in the environment of which peak amplitudes the amplitude of the transmit signal is reduced in a "soft" manner (gradual decrease of the average power and subsequent reduction to the original value) in a second step, such that a desired peak power is not exceeded. Since this generally constitutes a non-reversible operation, the information can no longer be recovered in the receiver in an ideal manner resulting in a higher error rate. Particularly, even in an interference-free channel a faultless transmission cannot be guaranteed.

Furthermore, a large number of other attempts are known ("block coding scheme for reduction of peak to mean envelope power ratio of multicarrier transmission schemes" by A. Jones, T. Wilkinson and S. Barton, Electronics Letter, December 1994, or "Reduction of peak to mean ratio of multicarrier modulation using cyclic coding" by D. Wulich, Electronics Letters, February 1996), from which it can be inferred that redundancy is introduced into the signal, mainly by using individual carriers not for data transmission purposes, but for influencing the transmission signal course. Often specially designed block codes for expressing the most favorable redundancy symbols are being applied. Partially it is attempted to simultaneously use said codes for correcting errors. A great disadvantage in these methods is that they are mostly only suited for a very small number of carriers, which is of no interest in practical application. Also, said methods are restricted to binary or perhaps quarternary phase shift keying (PSK) in the sub-channels. For each change in the constellation of the signals or carrier occupancy, therefore, an adopted strategy of redundancy introduction is required, which results in very inflexible methods.

Another method known from the prior art ("Multicarrier modulation with low peak-to-average power ratio" by M. Friese, Electronics Letters, April 1996) uses an iterative process for determining the redundant parameters. For obtaining a signal with very low peak values, however, an excessive amount of fourier transformations is necessary. Apart from the great numerical expenditure, above all the large required redundancy (up to 50%) is a major critical issue. The greatest disadvantage in practically all previously suggested attempts to provide a solution is that often only those peak amplitudes are avoided, which occur with an almost disappearing probability and can, thus, be neglected in practical operation anyway. In practice, however, it is the object to obtain a reduction of all signal peaks to a supportable extent. Also, the known methods have been strongly adapted to the symbol alphabet used, the concrete assignment of information to the signal points or the number of carriers, which makes them extremely unflexible.

It is the object of the invention to provide a method and device for digital transmission procedures, particularly by means of multicarrier modulation, whereby a recognizable reduction of the crest factor of the transmit signal is made feasible. It is particularly the object of the invention to provide a device and a method, whereby a maximum reduction of the crest factor with a minimum of additional redundancy is obtained, resulting in a reliable and significant reduction of the peak values independent of the number of carriers used in the multicarrier modulation procedure, which reduction is largely independent of the modulation procedures applied in the individual carriers and of the specific assignment of data to signal points, and which can be performed with justifiably more expenditure in the transmitter and the receiver.

According to the invention, this object is provided by the teaching of patent claim 1 and patent claim 17.

According to patent claim 1 the information to be transmitted is modified by a pre-set number of deterministic and reversible unambiguous representation functions, whereby in addition to the original information sequence, alternative information-equivalent sequences are generated in the transmitter. After modulating the equivalent information sequences a transmit signal for the actual transmission is selected from the information-equivalent transmit signals, which transmit signal is favorable in view of the occurring maximum signal amplitudes. In knowledge of the currently applied deterministic representation the original information can be reproduced.

Thus, the method according to the invention allows in an advantageous manner a clear reduction of the signal peak values in multicarrier modulation and thereby enable the operation of transmit amplifiers with a clearly smaller back-off with a comparable out-of-band radiation. The power components to be applied on the transmit side hereby become less expensive and can more efficiently be operated in one working point, which has a positive effect on the operation time of devices with no intermediate ac power supply, especially in mobile communication application.

Moreover, the method works with a justifiable higher expenditure in the transmitter and receiver, since often a sufficiently high reduction of the peak values can already be achieved with a few alternative information sequences. The invention works in all embodiments, independent of the concretely underlying modulation procedure in the individual carriers, the used signal alphabets, the specific assignment or the used number of carriers.

Further advantageous developments can be inferred from the subclaims.

A particularly advantageous development of the method consists in communicating the representation regulation performed with the transmitted signal sequence in the concrete case to the receiver via additional side information in a suitable way. Alternatively, the representation regulation can be regenerated by the receiver itself by means of suitable measures.

It is further advantageous, that only a fraction of additional redundancy is introduced into the signal. By the reduced dynamics of the occurring signal values, also the components for the digital/analog conversion in the transmitter and for the analog/digital conversion in the receiver can be reduced in the resolution, again leading to cost savings with regard to the devices.

Figure 2:
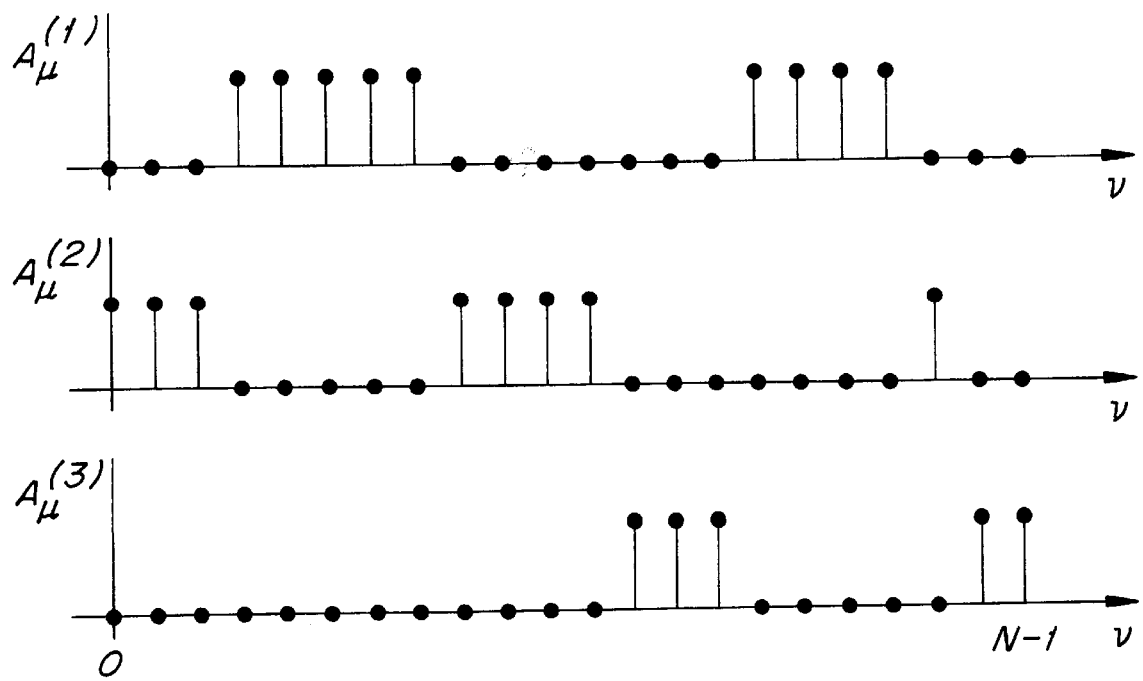
Figure 3:
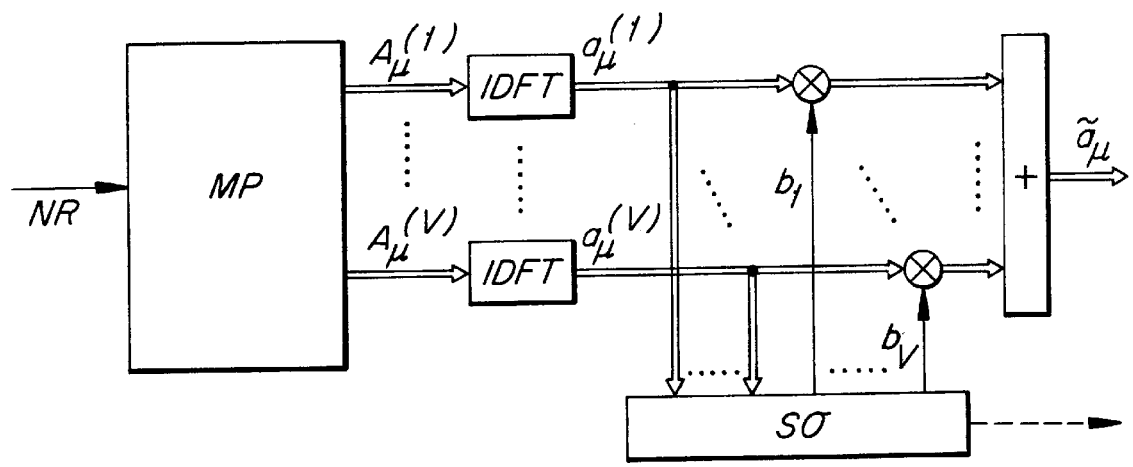
Figure 4:
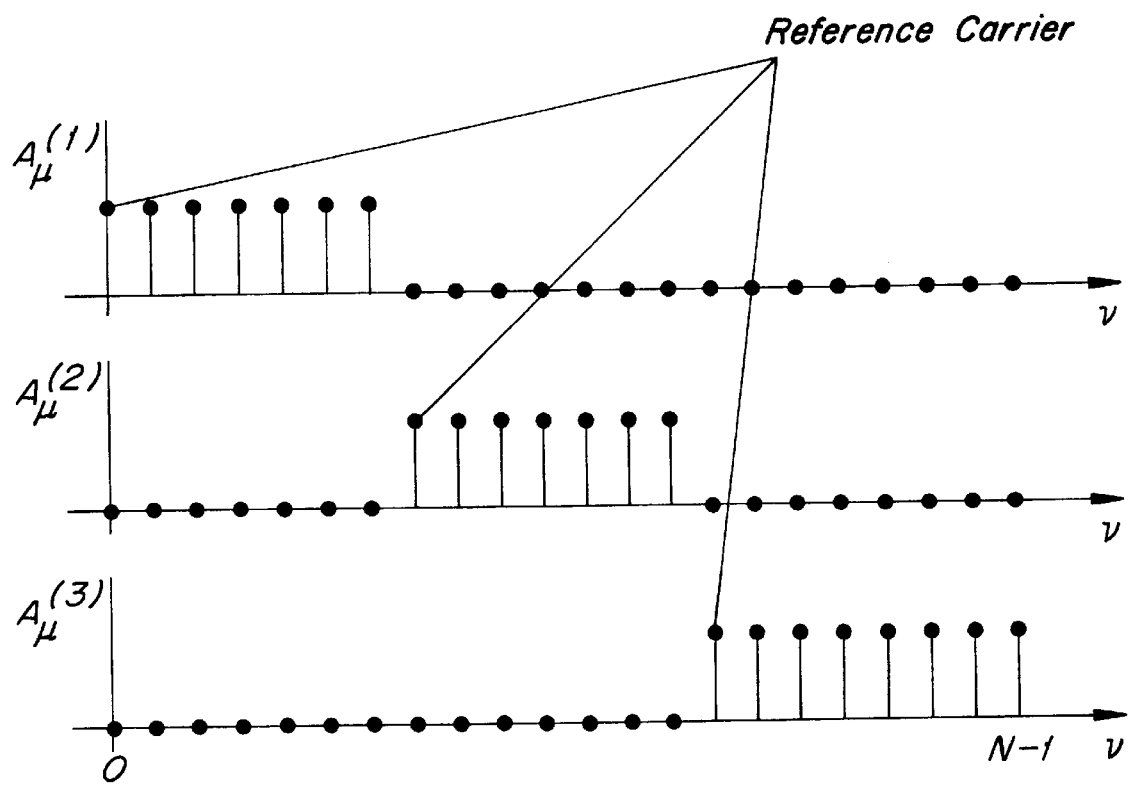

In the following the invention is explained in more detail by means of figures and embodiment:

FIG. 1 shows a representation of the inventive device for reducing the peak value problem in multicarrier methods, FIG. 2 shows a representation of a partition of the carriers on the subblocks for V=3, FIG. 3 shows a representation of the inventive device for restricting the peak value problem in multicarrier methods, FIG. 4 shows an example of an advantageous partition of the carriers on subblocks with differential modulation in frequency direction for V=3.

In the explained embodiment, different methods for generating information-equivalent information are applied.

In the following the invention is explained in more detail by means of FIG. 1 and a first embodiment.

Multicarrier transmission methods are commonly efficiently realized by representing blocks of the information NR supplied to the modulator by so-called mapping MP on a block (vector) $A_\mu$ of length N consisting of carrier values $A_{\mu,\nu}$, $\nu=0, \ldots, N-1$. Said mapping comprises a serial/parallel conversion of the information NR and the representation of information NR. The respective carrier values, i.e. the signal points, are selected from a discrete signal alphabet A as function of the respective information to be transmitted. In general, the signal points are complex numbers. A transmission sequence $a_{\mu,\rho}$ with $\rho=0, \ldots, N-1$ being part of said block consisting of carrier values, which in the following is designated by carrier constellation $A_\mu$, is obtained by Inverse Discrete Fourier Transformation IDFT of $A_\mu$. The transmission sequence of complex values $a_{\mu,\rho}$ is favorably combined to form a vector $a_\mu$. In addition, however, any other kind of transformation can be applied, e.g. the Walsh-Hadamard transformation, a discrete cosine transformation or the Karhunen-Loeve transformation. Part thereof is also a transmit pulse shaping with the common PAM transmission, a single-carrier procedure resulting for N=1, a transformation of a time-discrete signal into a time-continuous transmit signal. Also combinations of the mentioned transformations and a pulse shaping are possible.

In the first advantageous embodiment of the inventive method according to FIG. 1, U vectors $P^u = P^u_1, \ldots, P^u_{N-1}$, u=1 different from each other, comprising complex values $P_\nu^{(u)}$ and $|P_\nu^{(u)}|=\text{const.}$, $\nu=0, \ldots, N-1$ are stipulated between transmitter and receiver first. Alternatively, said vectors can also algorithmically be produced in transmitter and receiver according to the same standing predetermined regulation. Also, each of the modification vectors $P^{(u)}$ can be stipulated anew from one block to the consecutive one. The product $A_{\mu,\nu} P_\nu^{(u)}$ is then formed component-wise on the transmit side, and the pertinent time signals are calculated from the thereby formed blocks by means of the used transformation IDFT. From said U possibilities a favorable transmit signal $\tilde{a}_\mu$ is finally selected for the actual transmission by using an estimating means SM. In knowledge of the currently used vector $P^{(u)}$ the information vector $A_\mu$, and thus the information contained therein, can be recovered at receiving side through division with $P^{(u)}$.

Additionally, (as indicated by the interrupted lines) a differential modulation DM can be applied to the product $A_{\mu,\nu} \cdot P_\nu^{(u)}$, with the result that the used transmit channel needs not be estimated.

The selection of $P_\nu^{(u)}$ from the set $P_\nu^u \in \{\pm 1, \pm j\}$ with an absolute value $|P_\nu^{(u)}|=1$, for example, proves to be advantageous. The multiplication with a complex value results in a phase rotation, whereby the amplitude remains unmodified by the selection of this absolute value.

A possible development of the invention consists in communicating the number u of the modification vector $P^{(u)}$ as side information in the transmit signal itself to the receiver. This would be possible, for example, by reserving individual carriers $A_{\mu,\nu}$, which do not carry any useful information.

A second development is to be seen in that the number of $P^{(u)}$ is not explicitly communicated to the receiver, but that the receiver itself regenerates the number of the actually used vector $P^{(u)}$ for the inversion of the modification. In this respect an encoding for correcting errors, which is present anyway, would have to be applied for this task as well. For this purpose U decoders estimate vector $A_\mu$, whereby said U decoders each assume a possible vector $P^{(u)}$. Finally that estimated value is used for the further processing, which value shows the greatest probability.

In case of unknown or time-variant channels, as are used, for example, in mobile communications, the information is favorably not absolutely represented in the signal, but is differentially represented, i.e. in the modification of consecutive symbols $A_{\mu,\nu}$. This merely requires an integration (addition) on the transmit side following the multiplication with $P^{(u)}$, since $A_{\mu,\nu} \cdot P^{(u)}$ now constitute the increments. At receiving side, prior to a possibly present decoder and prior to the inversion of the modification, this step is undone by differentiation.

In the following another embodiment is explained by means FIGS. 2 and 3.

Another advantageous development of the invention is one to be favorably implemented for a linear signal transformation. An information NR is, as was explained in the preceding embodiment, represented by so-called mapping MP. In said embodiment, a partition of carriers $A_\mu$ occupied in the respective multicarrier modulation method into V subblocks takes place, each of which pair-wise occupy disjoint carrier positions with the corresponding amplitude values from the respective totality $A_\mu$ of the carrier values, whereby the total number of carrier positions adopted in this way in the respective subblocks $A_\mu^{(V)}$ is arbitrary. All carrier positions of the respectively regarded subblock being accommodated in other subblocks are occupied by zero. The partition of the individual carriers to the respective blocks is also arbitrary. A possible partition is depicted in FIG. 2. After the partitioning each carrier position from $A_\mu$ is represented in exactly one subblock $A_\mu^{(V)}$.

The thereby obtained subblocks $A_\mu^{(V)}$ of carriers are individually transferred in so-called partial transmit sequences $a_\mu^{(V)}$ by a number V of linear transformations IDFT (to be put in parallel by the corresponding hardware). Based on said sequences a targeted optimizing combination of the partial transmit sequences can be performed in a peak value optimization SO by means of a process suitable for this purpose, whereby only a small number of parameters $b_\nu$, with $b_\nu = \text{const.} \cdot e^{j\Phi_\nu}$, $\Phi_\nu \in [0, 2\pi]$ rotation (rotational expansion) of the complex signal is to be determined, the effect of which on the transmit signal can directly be inferred from the intermediate results $a_\mu^{(V)}$. The ideal result of the optimization with the optimum factors is $$(\hat{b}_1, \ldots, \hat{b}_\nu) = \underset{(b, \ldots, b)}{\text{argmin}}\left(\underset{\rho=0,\ldots,N-1}{\max} \left| \sum_{\nu=1}^{V} b_\nu \, a_{\mu,\rho}^{(\nu)} \right|\right), |b_\nu| = \text{const.} \quad (1)$$

$$\nu = 1, \ldots, V$$

transmit signal sequence $$a_\mu = \sum_{\nu=1}^{V} \hat{b}_\nu \, a_\mu^{(\nu)} \quad (2)$$

which, among all alternative transmit sequences, has the lowest peak value. According to the invention, however, other transmit sequences $\tilde{a}_\mu$ too can be generated and transmitted, which have a crest factor being sufficiently small for the application.

The inventive process according to the embodiment is applied as follows. For example, $b_1 = 1$ can be set, which means that one of the formed subblocks is transmitted always unrotatedly. Said block can, among others, comprise the carriers which for various reasons are to be transmitted with a distinct fixed phase position, such as pilot carriers for channel estimation. In case of a coherent or in time direction differentially coherent demodulation said carriers can, for example, also transmit the side information required in this respect. Thus, only V−1 phase positions are to be determined through optimization and to be transmitted to the receiver.

The side information can, for example, be directly transmitted with the modified multicarrier signal within the one unrotated subblock. Said information can thereby be protected by an efficient code and/or the information can be transmitted on carriers specifically reserved for this purpose with a low-grade and thus efficient modulation. The side information on the unrotated individual carriers, which can be arbitrarily spread over the frequency domain, can thus safely be obtained without any additional knowledge and immediately be used for demodulating the potentially rotated subblocks.

The number of possible rotational angles for the blocks should not be too large, in order not to allow the quantity of bits required for the transmission of the side information to increase unnecessarily. For reasons of facilitation one can restrict oneself to the four factors $b_\nu \in \{\pm 1, \pm j\}$ when implementing the attempt for a solution, whereby 2 (V−1) bits side information are to be transmitted per multicarrier signal sequence. Moreover, real multiplications no longer occur in respect of the implementing expenditure when combining the partial transmit signals to form the final transmit signal. The operations required for this purpose can then be easily performed by changing real and imaginary part as well as by additions and subtractions.

A restriction to four possible factors enables a sufficiently good reduction of the peak value, and a further increase in the possibilities does not yield any additional gains justifying the expenditure. The (sub) optimized are here determined by $$(\hat{b}_1, \ldots, \hat{b}_\nu) = \underset{(b, \ldots, b)}{\text{argmin}}\left(\underset{\rho=0,\ldots,N-1}{\max} \sum_{\nu=1}^{V} \left| b_\nu \, a_{\mu,\rho}^{(\nu)} \right|\right), b_\nu \in \{\pm 1, \pm j\} \quad (3)$$

$$\nu = 1, \ldots, V$$

In the device according to the embodiment, for example, specifically tuned transformation algorithms (e.g. for IDFT) can be realized, which make use of a major part of the input values in the carrier subblocks $A_\mu^{(V)}$ to be transformed being zero, whereby the increased expenditure through multiple transformations in the inventive method especially with a suitable subblock partition is reduced anew.

A very favorable embodiment of the method consists in that the information to be transmitted is each differentially modulated in a block-wise manner. This means that each block is differentially modulated from carrier to carrier for itself, i.e. in frequency direction. For this purpose, in principle all signal alphabets can be used, which can be modulated differentially, such as M-DPSK (M-ary Differential Phase-Shift Keying) or M-DAPSK (M-ary Differential Amplitude and Phase-Shift-Keying), processes obtaining a higher spectral efficiency. A transmission of explicit side information is no longer required in this scheme. Merely the block partition must be specified and known in both the transmitter and the receiver.

In connection with a differential modulation in frequency direction, different block partitions are possible, which in view of the present channel permit a reliable digital transmission. As is shown in FIG. 4 for V=3, for example, the individual blocks can be engaged in a comb-like manner. For minimal redundancy the block partition in the present embodiment of the method can, however, also be selected that adjacent, gap-free carriers are combined in one subblock. Thus, each of the V blocks only has one redundant reference carrier, which is left unmodulated as fixing point first, and can thus be interpreted as signal-shaping redundancy.

As desired, the differentially introduced information within a subblock remains untouched through the common rotation of all individual carriers in the subblock and can thereby be demodulated subblock-wise in the receiver without any side information.

Due to the asymmetry of the expenditure a method specialized in this way could ideally be applied in broadcast application, since the receivers nearly exactly correspond to the receiver with unprocessed transmit signal in view of their complexity, and are thereby do not become more expensive through the dynamics-reducing measures.

What is claimed is:

1. A method for reducing the crest factor in digital signal transmission, said method comprising the steps of:

obtaining digital information to be transmitted;

generating a plurality of alternative, information-equivalent sequences;

modifying the digital information by a sequence which is selected from said plurality of alternative, information-equivalent sequences, the selected sequence being favorable in respect of a peak value of a transmitted digital signal, to achieve a modified digital signal; and transmitting said modified digital signal;

wherein the modifying of the digital information is through transformation which generates a multicarrier transmission procedure and wherein the alternative, information-equivalent sequences are formed from carrier values $A_{\mu,v}$, $\mu=0, \ldots, N-1$, by multiplication with arbitrarily selective values $P_v^{(u)}$, $u=1, \ldots, U$.

2. The method according to claim 1, wherein the values of $P_v^{(u)}$ are firmly stipulated between a transmitter and a receiver.

3. The method according to claim 2, wherein the values of $P_v^{(u)}$ are separately determined for themselves, each according to the same pre-set regulation in the transmitter and the receiver.

4. The method according to claim 1, wherein $P_v^{(u)}$ is a complex number, the absolute value of which is $|P_v^{(u)}|$ equal to 1.

5. The method according to claim 1, wherein the number of u of values $P_v^{(u)}$ communicated to the receiver as side information.

6. The method according to claim 1, further comprising deriving the number u of values $P_v^{(u)}$ at a receiver from a receiving sequence.

7. The method according to claim 1, wherein the digital information is differentially represented in the modified digital signal, wherein the modifying carriers $A_{\mu,v} P^{(u)}$ each constitute increments of the digital information and wherein the modified digital signal can be achieved by integration.

8. A method for reducing the crest factor in digital signal transmission, said method comprising the steps of:

obtaining digital information to be transmitted;

generating a plurality of alternative, information-equivalent sequences;

modifying the digital information by a sequence which is selected from said plurality of alternative, information-equivalent sequences, the selected sequence being favorable in respect of a peak value of a transmitted digital signal, to achieve a modified digital signal;

transmitting said modified digital signal;

partitioning a block carrier $A_u$ into V subblocks $A_u^{(v)}$ $v=1, \ldots, V$, which are separately transferred into partial transmit sequences; and combining the subblocks and modifying the subblocks with arbitrary factors $b_1, \ldots, b_V$, to form an optimal information-equivalent sequence, wherein $b_1, \ldots, b_V$ has a complex value, the absolute value of which is $|b_1|= \ldots =|b_V|=1$, wherein the modifying of the digital information is through transformation which generates a multicarrier transmission procedure.

9. The method according to claim 8, further comprising communicating the factors $b_1, \ldots, b_V$ of the subblocks to a receiver as side information in a suitable representation.

10. The method according to claim 8, further comprising deriving the factors $b_1, \ldots, b_V$ in a receiver from a receiving frequency.

11. The method according to claim 8, wherein the digital information is differentially and not absolutely represented in the modified digital signal in frequency direction, and the subblock partition is selected for this purpose in a suitable manner.

12. A device for reducing the crest factor in digital signal transmission procedures, the device comprising:

a representation device for mapping digital information to carrier values ($A_u$);

a multiplier, for multiplying the carrier values ($A_u$) with arbitrarily eligible values ($P_v^{(u)}$);

a transformer, for transforming the carrier values into a plurality alternative information-equivalent sequences;

a means for selecting a sequence from the plurality of alternative information-equivalent sequences to yield a modified digital signal having a favorable peak value associated therewith; and a transmitter for transmitting the modified digital signal, wherein the modified digital signal is transformed from the digital information through a multicarrier transmission procedure.

13. The device of claim 12, wherein the alternative, information-equivalent sequences are formed from carrier values $A_{\mu,v}$, $\mu=0, \ldots, N-1$, and arbitrarily selective values $P_v^{(u)}$, $u=1, \ldots, U$.

14. The device of claim 12, wherein the values of $P_v^{(u)}$ are firmly stipulated between the transmitter and a receiver.

15. The device of claim 12, wherein the values of $P_v^{(u)}$ are separately determined for themselves, each according to the same pre-set regulation in the transmitter and a receiver.

16. The device of claim 12, wherein $P_v^{(u)}$ is a complex number, the absolute value of which is $|P_v^{(u)}|$ equal to 1.

17. The device of claim 12, wherein the means for selecting the sequence includes a partitioning mechanism for partitioning the carrier values $A_u$ into V subblocks $A_u^{(v)}$ $v=1, \ldots, V$, which are separately transferred into partial transmit sequences; and a combining and modifying mechanism for combining and modifying the subblocks with arbitrary factors $b_1, \ldots, b_V$, to form an optimal information-equivalent sequence, wherein $b_1, \ldots, b_V$, has a complex value, the absolute value of which is $|b_1|= \ldots =|b_V|=1$.

* * * * *